United States Patent
Lin

(10) Patent No.: US 10,908,824 B2
(45) Date of Patent: Feb. 2, 2021

(54) FLASH MEMORY STORAGE DEVICE AND METHOD THEREOF

(71) Applicant: Winbond Electronics Corp., Taichung (TW)

(72) Inventor: Hung-Hsueh Lin, Taichung (TW)

(73) Assignee: Winbond Electronics Corp., Taichung (TW)

( * ) Notice: Subject to any disclaimer, the term of this patent is extended or adjusted under 35 U.S.C. 154(b) by 36 days.

(21) Appl. No.: 16/183,760

(22) Filed: Nov. 8, 2018

(65) Prior Publication Data
US 2020/0150875 A1     May 14, 2020

(51) Int. Cl.
G06F 3/06     (2006.01)

(52) U.S. Cl.
CPC .......... *G06F 3/0616* (2013.01); *G06F 3/0652* (2013.01); *G06F 3/0658* (2013.01); *G06F 3/0679* (2013.01)

(58) Field of Classification Search
CPC .... G06F 3/0616; G06F 3/0652; G06F 3/0658; G06F 3/0679; G06F 21/554; G11C 16/16; G11C 16/3409; G11C 16/3477; G11C 16/3459; G11C 16/3445; G11C 16/08; G11C 16/10; G11C 16/34; G11C 16/06; G11C 16/107; G11C 16/14
USPC ........................................................ 711/103
See application file for complete search history.

(56) References Cited

U.S. PATENT DOCUMENTS

| | | | |
|---|---|---|---|
| 9,001,576 B2 | 4/2015 | Hong | |
| 9,153,331 B2 | 10/2015 | D'Abreu et al. | |
| 9,466,377 B2 | 10/2016 | Kho et al. | |
| 2001/0012216 A1* | 8/2001 | Taura | G11C 29/78 365/185.09 |
| 2007/0147121 A1* | 6/2007 | Futatsuyama | G11C 29/832 365/185.17 |
| 2008/0117688 A1* | 5/2008 | Park | G11C 16/3454 365/185.22 |
| 2009/0089482 A1* | 4/2009 | Traister | G11C 29/32 711/103 |
| 2009/0154252 A1* | 6/2009 | Shibata | G11C 16/14 365/185.22 |

(Continued)

FOREIGN PATENT DOCUMENTS

| | | |
|---|---|---|
| CN | 101154458 | 7/2012 |
| TW | M320715 | 10/2007 |

(Continued)

OTHER PUBLICATIONS

"Office Action of Taiwan Counterpart Application," dated Jun. 28, 2019, p. 1-p. 5.

*Primary Examiner* — Mano Padmanabhan
*Assistant Examiner* — Jean C Edouard
(74) *Attorney, Agent, or Firm* — JCIPRNET

(57) ABSTRACT

A flash memory storage device including a memory cell array and a memory control circuit is provided. The memory cell array includes a plurality of well regions. Each of the well regions includes a plurality of memory blocks and a record block. The memory control circuit is coupled to the memory cell array. The memory control circuit is configured to perform an erase operation on the memory blocks of each of the well regions and record erase times of each of the well regions into the respective record block. In addition, a method for operating a flash memory storage device is also provided.

16 Claims, 5 Drawing Sheets

(56) References Cited

U.S. PATENT DOCUMENTS

| | | | | |
|---|---|---|---|---|
| 2009/0257280 A1* | 10/2009 | Oh | ............... | G11C 16/0483 |
| | | | | 365/185.19 |
| 2009/0310408 A1* | 12/2009 | Lee | ............... | G11C 11/5628 |
| | | | | 365/185.03 |
| 2010/0290292 A1* | 11/2010 | Tanizaki | ............ | G11C 16/10 |
| | | | | 365/185.22 |
| 2011/0131368 A1* | 6/2011 | Lee | ............... | G06F 12/0246 |
| | | | | 711/103 |
| 2012/0170365 A1* | 7/2012 | Kang | ............ | G11C 16/0483 |
| | | | | 365/185.03 |
| 2014/0104950 A1* | 4/2014 | Yano | .............. | G11C 16/10 |
| | | | | 365/185.12 |
| 2014/0269069 A1* | 9/2014 | D'Abreu | ............ | G11C 16/16 |
| | | | | 365/185.11 |
| 2015/0179269 A1* | 6/2015 | Lee | ............. | G11C 16/14 |
| | | | | 365/185.03 |
| 2015/0213897 A1* | 7/2015 | Lin | ............... | G11C 16/3445 |
| | | | | 365/185.29 |
| 2016/0055917 A1* | 2/2016 | Lee | ............... | G11C 16/3445 |
| | | | | 365/185.11 |
| 2016/0196076 A1* | 7/2016 | Oh | ............... | G06F 12/0246 |
| | | | | 711/103 |
| 2018/0165025 A1* | 6/2018 | Murakami | ........... | G11C 16/16 |
| 2018/0211705 A1* | 7/2018 | Shim | ............... | G11C 16/3427 |

FOREIGN PATENT DOCUMENTS

| | | |
|---|---|---|
| TW | I348163 | 9/2011 |
| TW | I368224 | 7/2012 |
| TW | 201511013 | 3/2015 |

* cited by examiner

FLASH MEMORY STORAGE DEVICE AND METHOD THEREOF

BACKGROUND

Technical Field

The disclosure relates to a memory storage device and an operation method thereof. More particularly, the disclosure relates to a flash memory storage device and an operation method thereof.

Description of Related Art

For a flash memory storage device, an interface state is easily generated at a drain junction in a cycling operation, and oxide traps are generated in a tunnel oxide layer. Generally, the cycling operation includes an erase operation and a programming operation. A flash memory cell is deteriorated most of the time after repeated cycling operations, for example, reliability of a memory block decreases, or an erase time and a programming time increase, meaning that an operating speed slows down. In addition, after repeated cycling operations, part of the bits in the cell may also fail to meet specifications due to premature wear. The worn bits are difficult to be removed in a testing phase. Therefore, if the erase time of each of the well regions including multiple memory blocks in the memory cell array can be obtained, the performance of the flash memory storage device may be better evaluated in the subsequent application or manufacturing process.

SUMMARY

The disclosure provides a flash memory storage device and an operation method thereof capable of recording erase times of a well region included therein.

In an embodiment of the disclosure, a flash memory storage device includes a memory cell array and a memory control circuit. The memory cell array includes a plurality of well regions. Each of the well regions includes a plurality of memory blocks and a record block. The memory control circuit is coupled to the memory cell array. The memory control circuit is configured to perform an erase operation on the memory blocks of each of the well regions and record erase times of each of the well regions into the respective record block.

In an embodiment of the disclosure, an operation method of a flash memory storage device includes the following steps. An erase operation is performed on a plurality of memory blocks in the memory cell array. Whether erase times recorded in at least one record row reaches an upper limit value is determined. If the number of erase times recorded in the at least one record row reaches the upper limit value, the erase operation is simultaneously performed on the at least one record row while the erase operation is performed on the memory blocks in the memory cell array. Data of the erase times is recorded into the at least one record row if the erase times recorded in the at least one record row do not reach the upper limit value. The memory blocks and the record block are located in a same region block.

To sum up, in the embodiments of the disclosure, the flash memory storage device may automatically record the erase times of each of the well regions. Such recording data may be subsequently used to evaluate performance of the flash memory storage device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
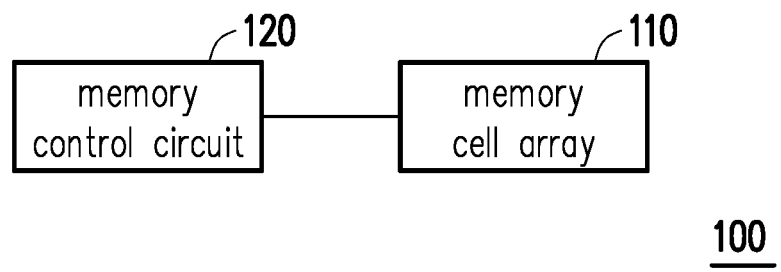
FIG. 1 is a schematic diagram illustrating a flash memory storage device according to an embodiment of the disclosure.
Figure 2:
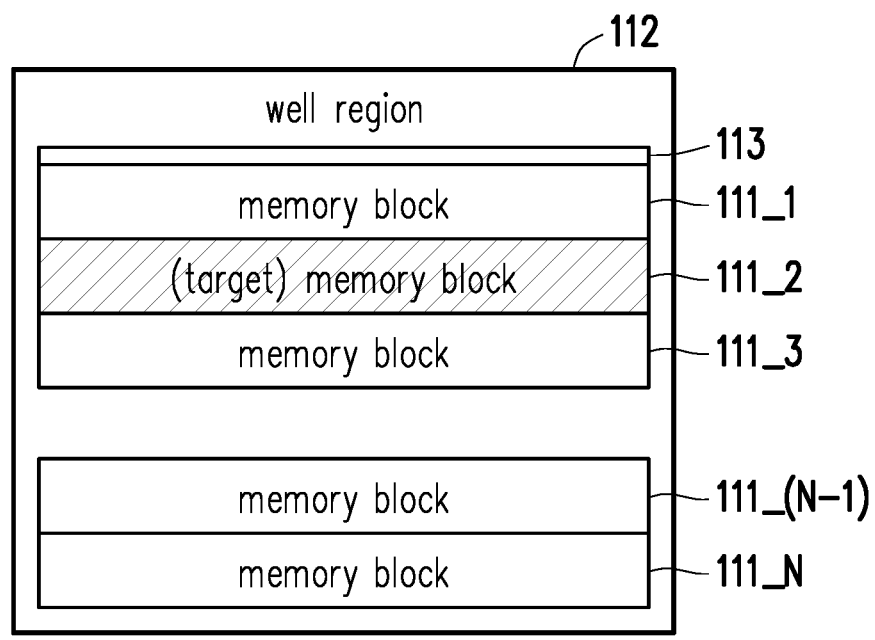
FIG. 2 is a schematic diagram illustrating one well region in a memory cell array of an embodiment of FIG. 1.

FIG. 1 is a schematic diagram illustrating a flash memory storage device according to an embodiment of the disclosure. FIG. 2 is a schematic diagram illustrating one well region in a memory cell array of an embodiment of FIG. 1. Referring to FIG. 1 and FIG. 2, a flash memory storage device 100 provided by the embodiment includes a memory cell array 110 and a memory control circuit 120. The memory control circuit 120 is coupled to the memory cell array 110. In this embodiment, the flash memory storage device 100 is, for example, a NOR flash memory device.

In this embodiment, the memory cell array 110 includes a plurality of well regions 112 as shown in FIG. 2. Only one well region 112 in the memory cell array 110 is depicted in FIG. 2; nevertheless, the disclosure is not limited by a number of the well regions. The well region 112 is, for example, a p-well region. The well region 112 includes a plurality of memory blocks 111_1 to 111_N and a record block 113. N is a positive integer greater than 0. The memory blocks 111_1 to 111_N are configured to store data. The record block 113 is configured to store erase times of the well region 112.

In this embodiment, the memory control circuit 120 is configured to perform an erase operation on the memory blocks 111_1 to 111_N of the well region 112 and record the erase times of the well region 112 into the record block 113. For instance, the memory control circuit 120 performs the erase operation on the target memory block 111_2 in an erase period. At this time, a positive high voltage is applied to the well region 112, a negative high voltage is applied to a memory cell array gate in the target memory block 111_2, and a positive voltage is applied to memory cell array gates of the rest of the memory blocks 111_1, 111_3, 111_(N−1), and 111_N. In this embodiment, the memory block 111_2 is erased, and the erase times of the well region 112 are increased by one time. Next, the memory control circuit 120 records the erase times into the record block 113. When any one of the memory blocks 111_1 to 111_N is erased, the erase times of the well region 112 is increased by one time.

In an embodiment of which a plurality of well regions are applied, the memory control circuit 120 performs the erase operation on the memory blocks of each of the well regions and records the erase times of each of the well regions into the respective record block.

In this embodiment, the memory control circuit 120 may be implemented by any suitable circuit structure in the technical field of the art, which is not limited by the disclosure. Sufficient teachings, suggestions, and implementation illustration related to the circuit structure and the method for operating the circuit structure may be obtained through the common knowledge in the technical field of the art.

Figure 3:
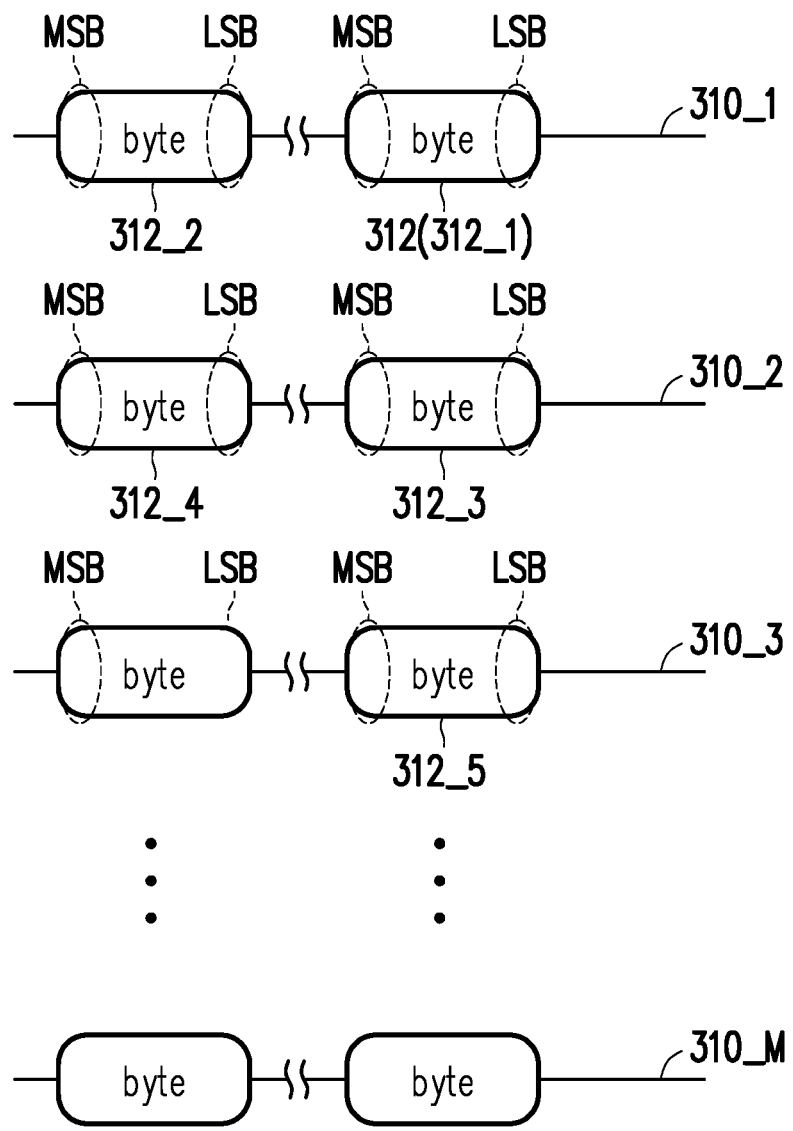
FIG. 3 is a schematic diagram illustrating a record block of the embodiment of FIG. 1.

FIG. 3 is a schematic diagram illustrating the record block of the embodiment of FIG. 1. With reference to FIG. 3, the record block 113 of this embodiment includes a plurality of record rows 310_1 to 310_M. M is a positive integer greater than 0. The record rows 310_1 to 310_M include a plurality of bytes 312. A number of bytes of each of the record rows may be identical or may be different. The record rows 310_1 to 310_M are configured to store data of the erase times. For instance, each of the record rows is, for example, a word line coupled to a plurality of memory cells (not shown), and some of the plurality of memory cells are configured to store the data of the erase times. For instance, in an embodiment, in each of the record rows, the plurality of memory cells correspondingly storing data volume of two bytes are configured to store the data of the erase times. In an embodiment, in each of the record rows, the plurality of memory cells correspondingly storing data volume of four bytes are configured to store the data of the erase times.

In this embodiment, the memory control circuit 120 records the data of the erase times into record rows starting from the first record row 310_0 to the last record row 310_M in sequence. The first record row 310_1 including two bytes is taken as an example, the memory control circuit 120 records the data of the erase times into bits of the byte 312_1 starting from a least significant bit LSB to a most significant bit MSB of the byte 312_1 in sequence. For instance, after performing the erase operation on any one of the memory blocks 111_1 to 111_N in the well region 112, the memory control circuit 120 programs the least significant bit LSB in the byte 312_1 from a state "1" to a state "0", so as to present an erase times increase in the well region 112 by one time and record the erase times into the byte 312_1. The memory control circuit 120 records the data of the erase times into the most significant bit MSB in the byte 312_1 in sequence through such manner.

Next, the memory control circuit 120 records the data of the erase times into the bits of the byte 312_2 starting from the least significant bit LSB to the most significant bit MSB in the byte 312_2 in sequence. Therefore, when all of the bits of the two bytes 312_1 and 312_2 in the record row 310_1 are programmed from the state "1" to the state "0", it means that the erase times of the well region 112 are 16 times. The 16 times represent an upper limit value of the erase times recorded in the record row 310_1. When the erase times recorded in the record row 310_1 (the first record row) reach the upper limit value of the record row 310_1, the memory control circuit 120 uses the next record row 310_2 (the second record row) to record the erase times recorded in the record row 310_1.

For instance, when the erase times recorded in the record row 310_1 reach the upper limit value of 16 times, when performing the erase operation on any one of the memory blocks in the erase period, the memory control circuit 120 simultaneously performs the erase operation on the record row 310_1, so as to erase all of the bits of the two bytes 312_1 and 312_2 from the state "0" to the state "1" for re-recording the erase time. At this time, when the record row 310_1 is erased by one time, the memory control circuit 120 programs the least significant bit LSB in the byte 312_3 of the record row 310_2 from the state "1" to the state "0", so as to present that the erase times of the record row 310_1 is 1 time, to further present accumulated erase times of the well region 112 reaching 17 times, and to record the erase times in the byte 312_3. The memory control circuit 120 records the data of the erase times into the most significant bit MSB in the byte 312_3 in sequence through such manner.

In this embodiment, after performing the erase operation on the record row 310_1, the memory control circuit 120 re-records the data of the erase times into the bytes 312_1 and 312_2 of the record row 310_1. Since the record bytes in the record row 310_1 are re-used, an upper limit of recording times of the record block 113 is increased.

Next, the memory control circuit 120 records the data of the erase times into the bits of the byte 312_4 starting from the least significant bit LSB to the most significant bit MSB in the byte 312_4 in sequence. Therefore, when all of the bits of the two bytes 312_3 and 312_4 in the record row 310_2 are programmed from the state "1" to the state "0", it means that the number of erase times of the well region 112 is 256 times. The 256 times represent an upper limit value of the erase times recorded in the record row 310_2. If the erase times recorded in the record row 310_1 and the record row 310_2 reach the upper limit value, the memory control circuit 120 simultaneously performs the erase operation on the record row 310_1 and the record row 310_2, so as to re-record the erase times. At this time, when the record row 310_1 and the record row 310_2 are erased, the memory control circuit 120 programs the least significant bit LSB in the byte 312_5 of the record row 310_3 from the state "1" to the state "0", so as to present the accumulated erase times of the well region 112 reaching 257 times and record the erase times into the byte 312_5. The memory control circuit 120 records the data of the erase times into the most significant bit MSB in the byte 312_5 in sequence through such manner.

In this embodiment, after the erase operation is performed on the record row 310_1 and the record row 310_2, the memory control circuit 120 re-records the data of the erase times into the bytes 312_1 and 312_2 of the record row 310_1 and the bytes 312_3 and 312_4 of the record row 310_2. Since the record bytes in the record row 310_1 and the record row 310_2 are re-used, the upper limit of recording times of the record block 113 is increased.

By analogy, if the number of erase times of recording 100,000 times is targeted, the record block 113 includes 4 record rows, the first to the third record rows store the data of the erase times with the memory cells correspondingly storing the data volume of two bytes, and the fourth record row stores the data of the erase times with the memory cells correspondingly storing the data volume of three bytes. When the erase times recorded in the last record row (e.g., 310_M) reach the upper limit value of the record row, that is, the upper limit value of the erase times recorded in the record block, the memory control circuit 120 no longer performs the erase operation on the last record row.

In another embodiment, the record block 113, for example, includes 4 record rows, the first to the third record rows store the data of the erase times with the memory cells correspondingly storing the data volume of four bytes, and the fourth record row stores the data of the erase times with the memory cells correspondingly storing the data volume of one byte. Hence, in this embodiment, the record block 113 may record the erase times of approximately 256,000 times.

In this embodiment, each of the record rows is, for example, a word line coupled to a plurality of memory cells (not shown), and some of the memory cells are configured to store the data of the erase times. Unlike the word lines coupled to the memory blocks 111_1 to 111_N, the word lines (i.e., the record rows) coupled to the record block 113 are word lines additionally disposed in the well region 112 for recording the erase times. When the memory control circuit 120 programs one effective bit in the bytes of the record row 310_1 (LSB record row) from the state "1" to the state "0", it means that the erase times of the well region 112 are increased by one time. When the erase times recorded in the record row 310_1 reach the upper limit value and the record row 310_1 is erased by one time, the memory control circuit 120 programs one effective bit in the bytes of the next record row 310_2 from the state "1" to the state "0", so as to present an erase times increase of the record row 310_1 by one time. When the erase times recorded in the bytes of the record row 310_1 to the record row 310_2 all reaches the upper limit values and the record row 310_1 to the record row 310_2 are simultaneously erased, the memory control circuit 120 programs one effective bit in the bytes of the next record row 310_3 from the state "1" to the state "0", so as to present an erase time increase of the record row 310_2 by one time. The erase times of the well region 112 may be obtained through calculating data statistics of the unequal values in the bytes of each of the record rows.

Figure 4:
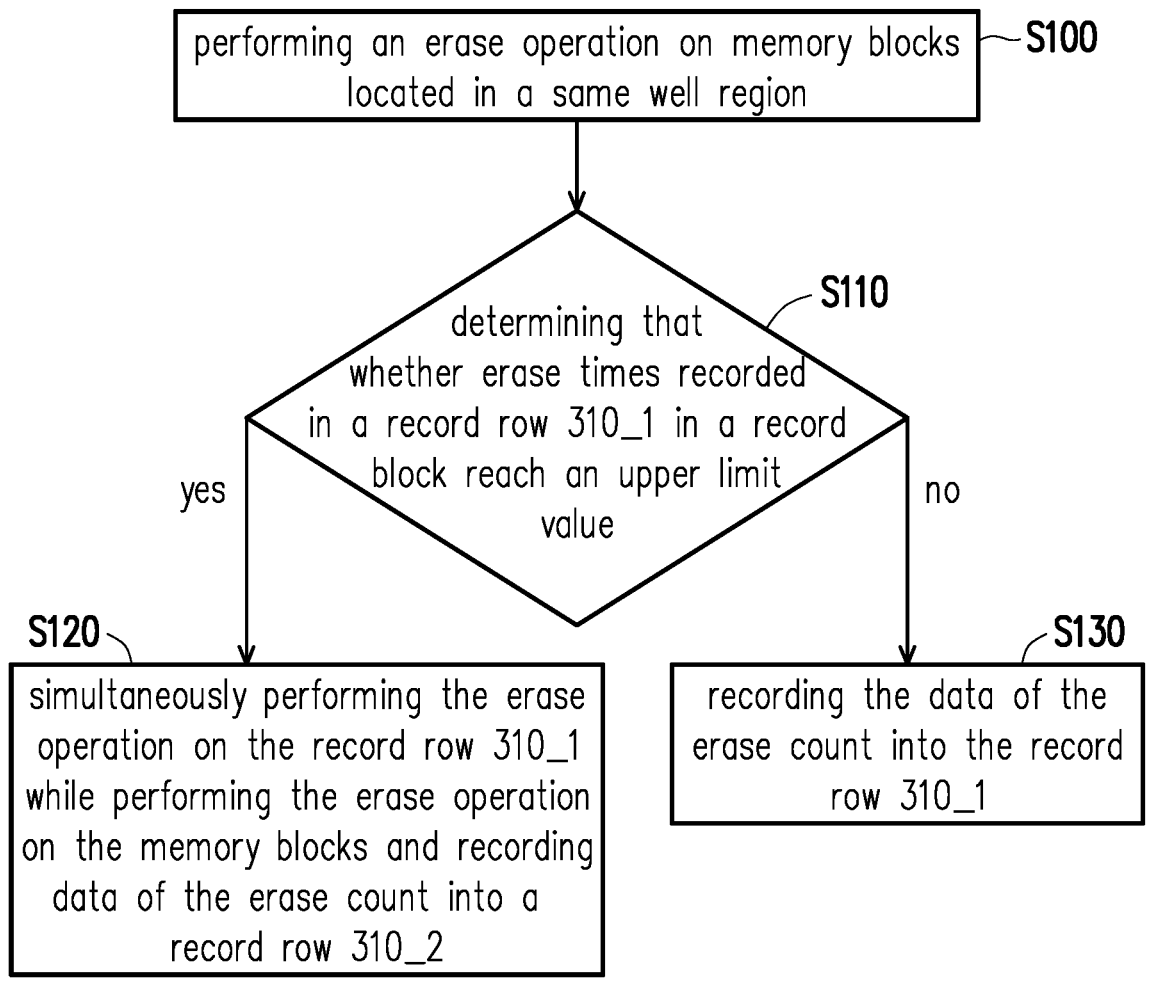
FIG. 4 is a flow chart illustrating steps of a method for operating a flash memory storage device according to an embodiment of the disclosure.

FIG. 4 is a flow chart illustrating steps of a method for operating a flash memory storage device according to an embodiment of the disclosure. The method of this embodiment is adapted to, for example, NOR flash memory storage devices. With reference to FIG. 1 to FIG. 4, in step S100, the memory control circuit 120 performs the erase operation on the memory blocks 111_1 to 111_N located in the same well region 112 in the memory cell array 110. In step S110, the memory control circuit 120 determines whether the erase times recorded in the record row 310_1 in the record block 113 reaches the upper limit value. If yes, the memory control circuit 120 performs step S120, so as to simultaneously perform the erase operation on the record row 310_1 while performing the erase operation on the memory blocks 111_1 to 111_N and record the data of the erase times into the record row 310_2. If no, the memory control circuit 120 performs step S130, so as to record the data of the erase times into the record row 310_1.

In addition, enough teaching, suggestion, and implementation illustration related to the method for operating the flash memory storage device provided by the embodiments of the disclosure may be obtained from the above embodiments of FIG. 1 to FIG. 3.

Figure 5:
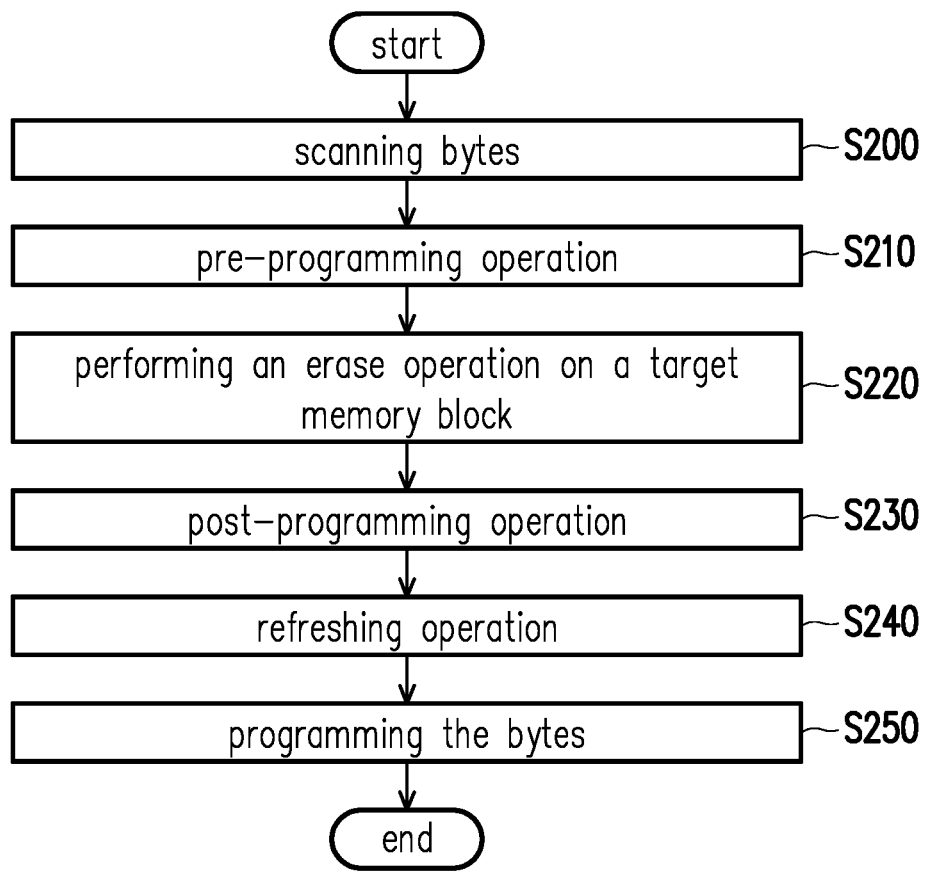
FIG. 5 is a flow chart illustrating steps of a method for operating a flash memory storage device according to another embodiment of the disclosure.

FIG. 5 is a flow chart illustrating steps of a method for operating a flash memory storage device according to another embodiment of the disclosure. The method of this embodiment is adapted to, for example, NOR flash memory storage devices. With reference to FIG. 5, in this embodiment, the memory control circuit 120 performs the erase operation on the memory blocks 111_1 to 111_N located in the same well region 112 in the memory cell array 110. The erase operation includes performing a pre-programming operation (step S210), an erase operation (step S220), and a post-programming operation (step S230) on the target memory block 111_2, so as to perform soft-programming on an excessively-erased memory cell in the target memory block and perform a refreshing operation (step S240) on the memory blocks 111_1 and 111_3 to 111_N excluding the target memory block. In this way, the programmed memory cells in the non-target memory blocks are programmed. In this embodiment, enough teaching, suggestion, and implementation illustration related to the pre-programming operation, the erase operation, and the post-programming operation on the target memory block 111_2 as well as the refreshing operation on the memory blocks 111_1 and 111_3 to 111_N excluding the target memory block may be obtained through common knowledge in the technical field of the art.

In this embodiment, before step S210 is performed, the memory control circuit 120 scans the bytes 312_1 and 312_2 in the record row 310_1 to determine which bit is in the state "1" in step S200. If at least one bit in the bytes 312_1 and 312_2 is in the state "1", the memory control circuit 120 may record the data of the erase times in the bit in the state "1" in step S250. If all of the bits of the bytes 312_1 and 312_2 are in the state "0", the memory control circuit 120 may record the data of the erase times in the record row 310_2 in step S250, that is, program the record row 310_2. Further, in step S220, when performing the erase operation on the target memory block 111_2, the memory control circuit 120 simultaneously performs the erase operation on the record row 310_1.

In step S200, after scanning, if the memory control circuit 120 determines that all bits of the bytes in the record rows 310_1 and 320_2 are in the state "0", the memory control circuit 120 may record the data of the erase time into the next record row of the record row 310_2 in step S250. Further, in step S220, when performing the erase operation on the target memory block 111_2, the memory control circuit 120 simultaneously performs the erase operation on the record rows 310_1 and 310_2. The erase operation of the remaining record rows by the memory control circuit 120 may be deduced by analogy.

In this embodiment, when performing the post-programming operation and the refreshing operation on the memory blocks 111_1 to 111_N in step S230 and step S240, the memory control circuit 120 simultaneously performs the post-programming operation and the refreshing operation on the record block 113. In addition, enough teaching, suggestion, and implementation illustration related to the method for operating the flash memory storage device provided by the embodiments of the disclosure may be obtained from the above embodiments of FIG. 1 to FIG. 4.

Figure 6:
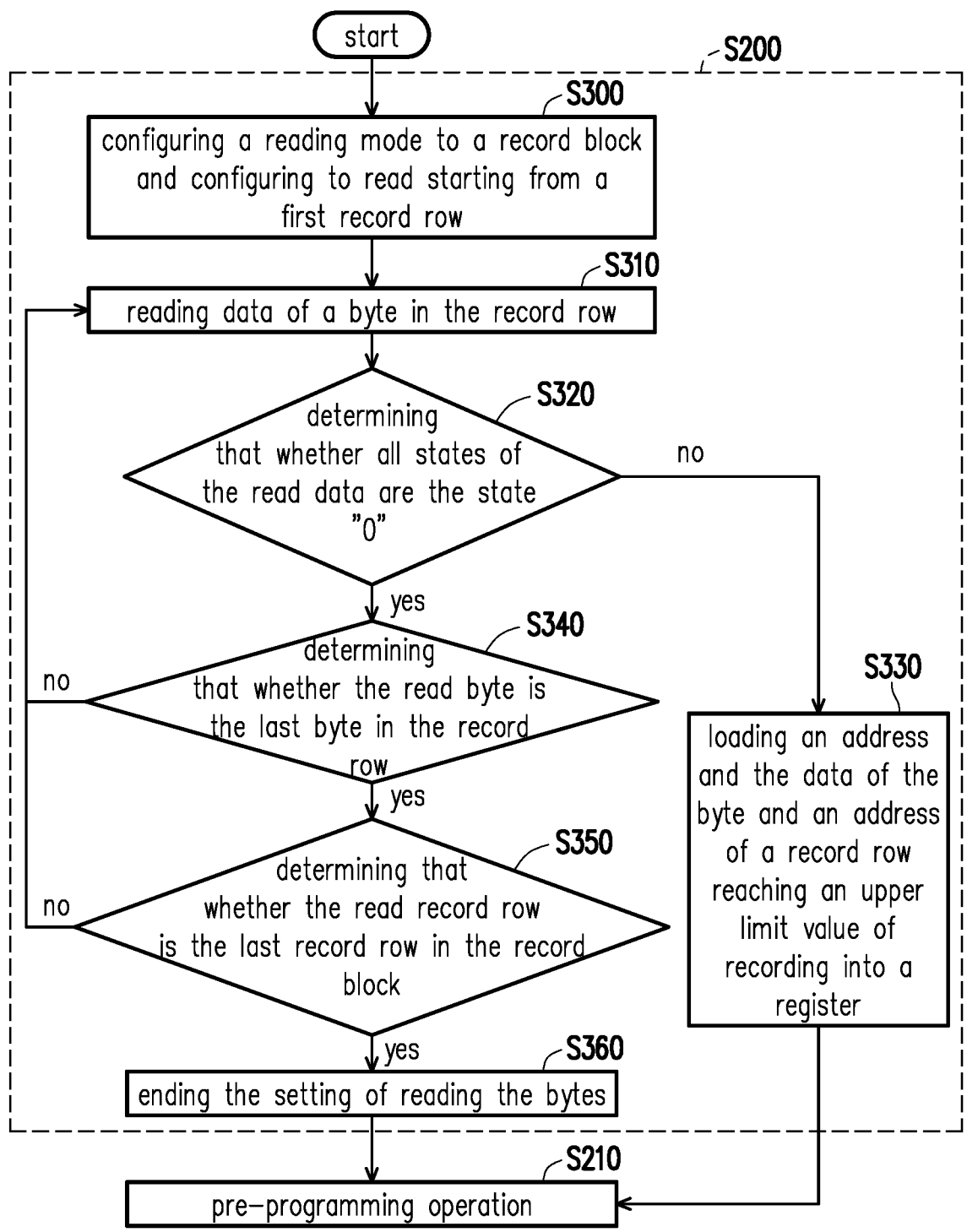
FIG. 6 is a flow chart illustrating step S200 of FIG. 5 in detail.

FIG. 6 is a flow chart illustrating step S200 in FIG. 5 in detail. With reference to FIG. 3 and FIG. 6 together, in step S300, the memory control circuit 120 configures a reading mode to the record block 113 and configures to read starting from the record row 310_1. In step S310, the memory control circuit 120 reads data of the byte 312_1 starting from the least significant bit LSB in the byte 312_1. In step S320, the memory control circuit 120 determines whether all states of the read data are the state "0".

If not all data states are the state "0", for instance, at least one data state is the state "1", the memory control circuit 120 performs step S330 and loads an address and the data of the byte 312_1 into a register and programs the byte 312_1 in step S250. For instance, the memory control circuit 120 performs a one-bit programming operation on the bit in the byte 312_1 whose data state is not the state "0" so as to record the erase times. After step S330 is performed, the memory control circuit 120 performs step S210 in FIG. 5.

If all data states are the state "0", the memory control circuit 120 performs step S340 to determine that whether the read byte is the last byte in the record row 310_1. If the read byte is not the last byte in the record row 310_1, the memory control circuit 120 performs step S310 to read the next byte, that is, the byte 312_2. If the read byte is the last byte in the record row 310_1, the memory control circuit 120 performs step S350 to determine that whether the read record row is the last record row 310_M in the record block 113.

If the read record row is not the last record row 310_M in the record block 113, the memory control circuit 120 performs step S310 to read the first byte of the next record row, for example, the byte 312_3 of the record row 310_2. If not all data states are the state "0", the memory control circuit 120 performs step S330. The memory control circuit 120 loads an address and the data of the byte 312_3 and an address of the record row reaching the upper limit value of recording into the register. The memory control circuit 120 simultaneously performs the erase operation on the record row 310_1 when performing the erase operation on the target memory block in step S210 to step S240 and performs the one-bit programming operation on the bits whose data states are not the state "0" in the byte 312_3 to record the erase times in step S250. If the read record row is the last record row 310_M in the record block 113, the memory control circuit 120 performs step S360 to end the setting of reading the bytes. After step S360 is performed, the memory control circuit 120 performs step S210 in FIG. 5.

In view of the foregoing, in the embodiments of the disclosure, the flash memory storage device may automatically record the erase times of each of the well regions in the respective record block. The record rows in the record block are word lines additionally disposed in the well regions to record the erase times, and part or all of the memory cells coupled to the record rows may be configured to store the data of the erase times. Such recording data may be subsequently used to evaluate performance of the flash memory storage device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A flash memory storage device, comprising:
    a memory cell array, comprising a plurality of well regions, each of the plurality of well regions comprising a plurality of memory blocks and a record block, wherein the record block is located inside each of the plurality of well regions; and
    a memory control circuit, coupled to the memory cell array, configured to perform an erase operation on the plurality of memory blocks of each of the plurality of well regions and record erase times of each of the plurality of well regions into the respective record block,
    wherein the record block comprises at least one record row,
    wherein the memory control circuit determines whether erase times recorded in at least one record row reach an upper limit value,
    the memory control circuit simultaneously performs the erase operation on the at least one record row while performing the erase operation on the plurality of memory blocks in the memory cell array during an erase period if the erase times recorded in the at least one record row reach the upper limit value.

2. The flash memory storage device as claimed in claim 1, wherein the record block comprises a plurality of record rows configured to store data of the erase times, and each of the record rows comprises a plurality of bytes.

3. The flash memory storage device as claimed in claim 2, wherein the memory control circuit records the data of the erase times into the record rows of the record block starting from a first record row to a last record row of the record block in sequence.

4. The flash memory storage device as claimed in claim 3, wherein the memory control circuit records the data of the erase times into bits of each of the bytes starting from a least significant bit to a most significant bit of each of the bytes in sequence.

5. The flash memory storage device as claimed in claim 2, wherein the erase times recorded in each of the record rows have the upper limit value, the record rows comprise a first record row and a second record row, when the erase times recorded in the first record row reach the upper limit value of the first record row, the memory control circuit uses the second record row to record the erase times recorded in the first record row until the erase times recorded in the second record row reaches the upper limit value of the second record row.

6. The flash memory storage device as claimed in claim 5, wherein the memory control circuit performs the erase operation on the first record row in the erase period when the erase times recorded in the first record row reach the upper limit value of the first record row.

7. The flash memory storage device as claimed in claim 6, wherein the memory control circuit simultaneously performs the erase operation on the first record row while performing the erase operation on the plurality of memory blocks during the erase period.

8. The flash memory storage device as claimed in claim 5, wherein the second record row is a next record row of the first record row in the record block.

9. The flash memory storage device as claimed in claim 6, wherein the memory control circuit re-stores the data of the erase times into the erased first record row after performing the erase operation on the first record row.

10. A method for operating a flash memory storage device, wherein the flash memory storage device comprises a memory cell array, the memory cell array comprises a record block, the record block comprises at least one record row, and the method comprises:
    performing an erase operation on a plurality of memory blocks in the memory cell array, wherein the memory blocks and the record block are located in a same region block,
    wherein the record block is located inside each of the plurality of well regions;
    determining that whether erase times recorded in at least one record row reach an upper limit value;
    simultaneously performing the erase operation on the at least one record row while performing the erase operation on the plurality of memory blocks in the memory cell array if the erase times recorded in the at least one record row reach the upper limit value; and
    recording data of the erase times into the at least one record row if the erase times recorded in the at least one record row do not reach the upper limit value.

11. The method for operating the flash memory storage device as claimed in claim 10, wherein the at least one record row comprises a plurality of record rows, and the step of recording the data of the erase times into the at least one record row comprises:

recording the data of the erase times into the record rows of the record block starting from a first record row to a last record row of the record block in sequence.

12. The method for operating the flash memory storage device as claimed in claim 11, wherein each of the record rows comprises a plurality of bytes configured to store the data of the erase times, and the step of recording the data of the erase times into the at least one record row further comprises:

recording the data of the erase times into bits of each of the bytes starting from a least significant bit to a most significant bit of each of the bytes in sequence.

13. The method for operating the flash memory storage device as claimed in claim 10, wherein the at least one record row comprises a first record row and a second record row, and the erase operation is simultaneously performed on the first record row while the erase operation is performed on the plurality of memory blocks in the memory cell array when the erase times recorded in the first record row reach the upper limit value of the first record row in the step of performing the erase operation on the at least one record row when the recorded erase times of the at least one record row reach the upper limit value.

14. The method for operating the flash memory storage device as claimed in claim 13, wherein the second record row is used to record the erase times of the first record row until the erase times recorded in the second record row reach the upper limit value of the second record row in the step of recording the data of the erase times into the at least one record row.

15. The method for operating the flash memory storage device as claimed in claim 13, wherein the second record row is a next record row of the first record row in the record block.

16. The method for operating the flash memory storage device as claimed in claim 13, wherein the data of the erase times is re-stored into the erased first record row after the erase operation is performed on the first record row in the step of recording the data of the erase times into the at least one record row.

\* \* \* \* \*